United States Patent
Arnold

[15] 3,665,783
[45] May 30, 1972

[54] STEERING GEAR ASSEMBLY

[72] Inventor: Guenther Arnold, Russelsheim, Germany
[73] Assignee: General Motors Corporation, Detroit, Mich.
[22] Filed: Jan. 18, 1971
[21] Appl. No.: 107,079

[30] Foreign Application Priority Data

Jan. 29, 1970 Germany.................P 20 03 962.7

[52] U.S. Cl..............................................74/498
[51] Int. Cl................................................B62d 1/20
[58] Field of Search.................74/498, 499, 500, 496

[56] References Cited

UNITED STATES PATENTS

| | | |
|---|---|---|
| 2,916,945 | 12/1959 | Rittenhouse et al.........74/498 X |
| 2,984,121 | 5/1961 | Folkerts........................74/498 X |
| 3,060,762 | 10/1962 | Lutz...............................74/498 X |
| 3,170,338 | 2/1965 | Ivanchich...........................74/499 |
| 3,252,348 | 5/1966 | Folkerts........................74/498 X |

Primary Examiner—William F. O'Dea
Assistant Examiner—P. D. Ferguson
Attorney—W. E. Finken and D. L. Eliss

[57] ABSTRACT

A steering gear assembly for a motor vehicle has a toothed rack meshing with a sector on a steering output shaft. A wedge member is biased into engagement with the output shaft to displace it in a sense tending to take up play between the teeth of the rack and the sector, which take up is greatest at a centered position of the steering output shaft.

8 Claims, 4 Drawing Figures

Patented May 30, 1972 3,665,783
2 Sheets-Sheet 1
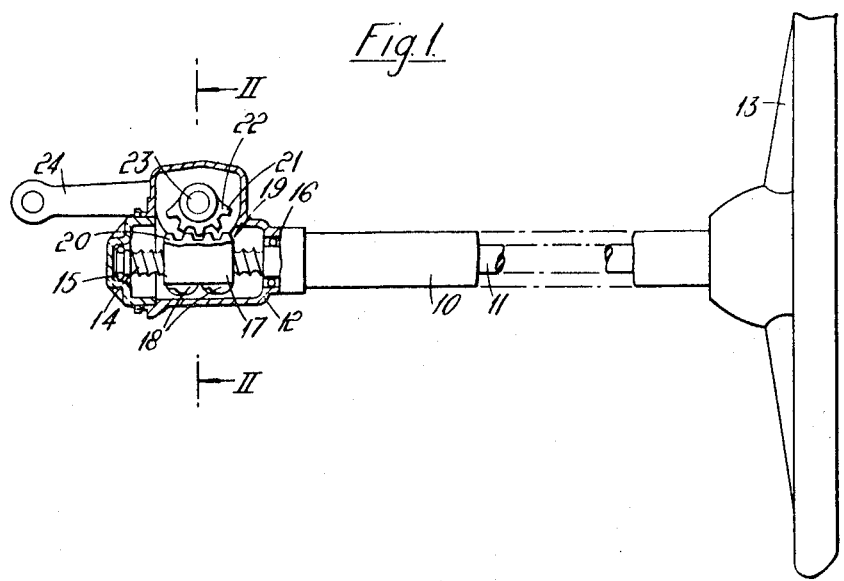
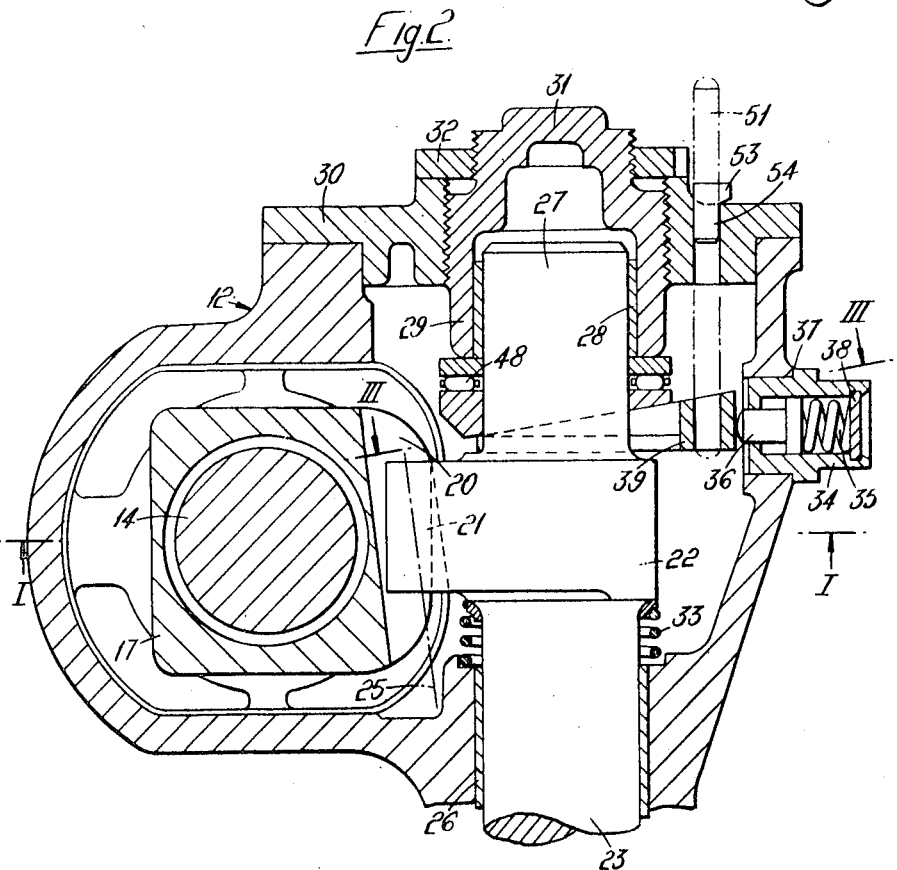
Inventor
Guenther Arnold
BY
D. L. Ellis
Attorney

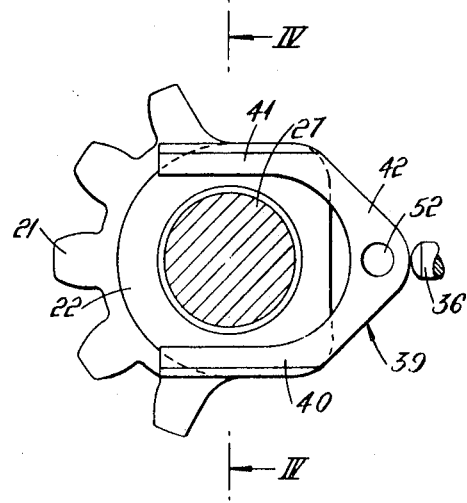
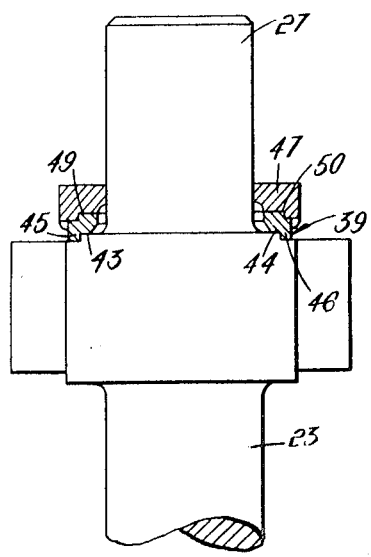

STEERING GEAR ASSEMBLY

This invention relates to a steering gear assembly for use in a motor vehicle.

It is an object of the invention to take up play between teeth of a worm and a sector of the steering gear assembly when the sector is centered, and yet allow some degree of play between the teeth when the sector is rotated to steer the vehicle.

In the drawings:

FIG. 1 is a section in transverse direction along a steering column through a steering gear with a steering nut and a steering sector (both shown in elevation) corresponding to a section along line I—I in FIG. 2.

FIG. 2 is a section along line II—II in FIG. 1.

FIG. 3 is an illustration of the steering sector and a wedge member according to the invention, seen from the section III—III in FIG. 2 in the direction of the arrow; and FIG. 4 is a section along line IV—IV of FIG. 3.

A steering column 10 of a motor vehicle (not shown) encloses a major portion of a steering input shaft 11, and the column is secured at one end to a housing 12. A steering wheel 13 is fixed on the end of the input shaft remote from the housing. The input shaft has an end portion which extends into the housing and is rotatbly supported therein by ball bearings 15 and 16. This end portion of the input shaft is formed as a steering worm 14. A steering nut 17 is mounted on said worm for axial movement thereon and is held against rotation. Anti-friction balls (not shown) disposed between the worm and the nut transmit rotary motion from the input shaft to the nut. A return tube 18 serves to recirculate the balls. The steering nut 17 has a rack 19 with teeth 20 which mesh with teeth 21 of a steering sector 22. The steering sector 22 is formed on a steering output shaft 23 on to which a steering arm 24 is keyed. The steering nut 17 has teeth 19, 20 whose flanks are generated along an axis extending obliquely to the longitudinal axis of the output shaft 23, such that upon displacement of the output shaft 23 towards the steering arm 24 the teeth of the sector and nut tend to engage more deeply with the result that clearance between them is reduced and any play is taken up. The common center line 25 of tooth engagement (FIG. 2) runs obliquely of the longitudinal axis of the steering output shaft 23.

Also, the teeth of the steering nut 17 and of the steering sector 22 are so designed that the flank clearance between the teeth increases on both sides of the centered position (driving straight), the center tooth of the steering is thicker than the teeth on either side thereof. The steering output shaft 23 is mounted in a bearing 26, and has an extension 27 journalled in a bearing 28. The bearing 28 is inserted in the bearing eye 29 of a cap 31 screwed into a bearing cover 30. The cap 31 is secured by means of a nut 32 in the housing 12. A helical compression spring 33 is located between the sector 22 and the adjacent portion of the housing 12, around a part of the steering output shaft 23. This spring exerts a biasing force on the steering output shaft 23 tending to increase tooth flank clearance between the rack and sector teeth.

Screwed into the steering gear housing 12 is a housing portion 34 containing a compression spring 35 and a thrust pin 36 which pin protrudes through an opening 37 in the housing portion 34 into the housing 12. The pin has a headed end which, forms a stop for the compression spring 35 which at its other end bears against a disc 38 slotted into the housing portion 34.

A forked adjusting wedge member 39 is arranged between the sector 22 and the bearing cap 31, and has two prongs 40 and 41 which embrace the journal 27 on the extension of the shaft 23 (FIG. 3). The wedge member has a bridge portion 42 against which, in the mid-position of the steering gear, the thrust pin 36 bears under the force of the spring 35. The bridge portion 42 of the wedge member 39 is so designed that in a centered position of the output shaft (vehicle driven straight) the thrust pin 36 is pushed back at its furthest, but with increased rotation of the steering sector 22 from this centered position, the pin protrudes further. The result is that the displacement force exerted by the compression spring 35 via the thrust pin 36 upon the wedge member 39, is a maximum in the centered position but falls away steadily in both directions up to the position in which, when the angle of turn of the steering sector reaches about 30°, the thrust pin 36 comes to rest with its head abutting the end of the housing 34. On further turning of the steering sector 22 beyond this angle, the thrust pin 36 clears the bridge portion 42 of the adjusting wedge member 39, so that force is no longer exerted on the wedge member in a sense tending to displace the steering output shaft.

As will be seen from FIG. 4, the prongs 40 and 41 are of S-shaped cross-section. The sector 22 has two slide tracks 43 and 44 arranged parallel with and symmetrical to the steering sector. In order to guide the adjusting wedge member 39, these tracks are gripped by the slide rails 45, 46 of this wedge 39. Similarly, the adjacent thrust member 47 of an axial roller bearing 48 is guided by means of slide tracks 49, 50 on the prongs 40, 41 of the adjusting wedge 39. The inclination of these slide tracks corresponds to the slope of the adjusting wedge.

The adjusting device according to the invention operates as follows:

In the event of wear at the tooth flanks of the steering sector 22 and the rack 19 of the steering nut 17, the spring effort (acting with maximum force in the centered position of the steering sector 22) causes the adjusting wedge 39 to advance, while overcoming the axial force exerted by the helical spring 33, until the flank clearance is annulled. The force exerted by the spring 35 and the force exerted by the helical spring 33 are so regulated with respect to each other that adjustment of the flank clearance is possible only in the centered position of the steering sector (driving straight). Turning from this centered position, the flank clearance increases in both directions of steering lock, but without any regulating movement of the adjusting wedge 39 taking place. In this case wedge 39 acts as an arresting stop for the helical spring 33.

The inclination of the adjusting wedge 39 and the strength of the compression spring 35 and the strength of the helical spring 33 are so regulated with respect to each other that adjustment of the wedge takes place only in the centered position of the steering segment 22, although at small steering locks up to a lock angle of about 30° a design degree of force is exerted on the wedge 39 in the direction of adjustment.

A mounting pin member 51 is shown in dotted lines in FIG. 2, and this pin member engages in a bore 52 in the bridge portion 42 of the adjusting wedge member 39 and is inserted into the housing through a bore 54 in the housing. This pin member is an assembly aid to ensure that, when the bearing cap 31 is being screwed in, the adjusting wedge member 39 is satisfactorily held on the slide tracks 43, 44 of the steering sector 22 and the adjoining thrust member 47 with its slide tracks 49, 50 is also held on the adjusting wedge 39. When assembly has been completed, the mounting pin member 51 is removed and the bore 54 is closed by a plug 53. The bore 54 can be used for replenishing the housing with lubricating oil.

I claim:

1. A steering gear assembly comprising:
   a housing;
   a steering input shaft having an end portion thereof extending into said housing;
   bearing means rotatably mounting said steering shaft end portion with respect to said housing;
   a steering worm on said end portion of said steering shaft;
   a steering nut mounted on said worm for axial movement thereon;
   a plurality of rack teeth formed on said nut, said teeth having flanks generatod along an axis extending obliquely to and substantially radially of, said worm;
   a steering output shaft having an end portion thereof extending into said houwing;
   a sector on said end portion of said output shaft;
   a plurality of teeth formed on said sector for meshing engagement with said rack teeth;

a thrust member mounted on said end portion of said output shaft, said member abutting a portion of said housing;

a generally U-shaped wedge member mounted on said output shaft between said sector and said thrust member, and movable in a radial plane of said output shaft, but fixed to said shaft for rotary movement therewith;

a biasing arrangement secured in said housing and effective in a centered position of said output shaft to engage said wedge member and thereby tend to displace said shaft longitudinally in a sense to take up play between the flanks of said rack and sector teeth.

2. A steering gear assembly as claimed in claim 1, wherein the wedge member has two pairs of opposed side faces and the one of said pairs adjacent said sector runs substantially radially of said output shaft longitudinal axis and the other of said pairs adjacent said thrust member runs obliquely to said one pair and said longitudinal axis.

3. A steering gear assembly comprising:
a housing;
a steering input shaft having an end portion thereof extending into said housing;
bearing means rotatably mounting said steering shaft end portion with respect to said housing;
a steering worm on said end portion of said steering shaft;
a steering nut mounted on said worm for axial movement thereon;
a plurality of rack teeth formed on said nut, said teeth having flanks generated along an axis extending obliquely to and substantially radially of, said worm;
a steering output shaft having an end portion thereof extending into said housing;
a sector on said end portion of said output shaft;
a plurality of teeth formed on said sector for meshing engagement with said rack teeth;
a thrust member mounted on said end portion of said output shaft, said member abutting a portion of said housing;
a generally U-shaped wedge member mounted on said output shaft between said sector and said thrust member, and movable in a radial plane of said output shaft, but fixed to said shaft for rotary movement therewith, said U-shaped wedge member having two limb portions which extend over said output shaft, each limb portion having slide rail portions which abut said output shaft and said thrust member whereby said wedge member is fixed on said output shaft and held against rotation with respect to said output shaft and said thrust member;
a biasing arrangement secured in said housing and effective in a centered position of said output shaft to engage said wedge member and thereby tend to displace said shaft longitudinally in a sense to take up play between the flanks of said rack and sector teeth.

4. A steering gear assembly comprising:
a housing;
a steering input shaft having an end portion thereof extending into said housing;
bearing means rotatably mounting said steering shaft end portion with respect to said housing;
a steering worm on said end portion of said steering shaft;
a steering nut mounted on said worm for axial movement thereon;
a plurality of rack teeth formed on said nut, said teeth having flanks generated along an axis extending obliquely to and substantially radially of, said worm;
a steering output shaft having an end portion thereof extending into said housing;
a sector on said end portion of said output shaft;
a plurality of teeth formed on said sector for meshing engagement with said rack teeth;
a thrust member mounted on said end portion of said output shaft, said member abutting a portion of said housing;
a generally U-shaped wedge member mounted on said output shaft between said sector and said thrust member, and movable in a radial plane of said output shaft, but fixed to said shaft for rotary movement therewith;

a biasing arrangement secured in said housing and effective in a centered position of said output shaft to engage said wedge member and thereby tend to displace said shaft longitudinally in a sense to take up play between the flanks of said rack and sector teeth, and the wedge member has a nose portion which in the centered position of the output shaft is engaged by said biasing arrangement, and said nose portion has obliquely extending flanks whereby when said output shaft is displaced from said centered position said biasing arrangement exerts a lesser bias on one of said flanks to thereby reduce said play take up between the flanks of said rack and sector teeth.

5. A steering gear assembly according to claim 4, wherein said biasing arrangement includes a spring loaded plunger adapted to engage said nose portion, and a stop member limits movement of said plunger against said one flank of said nose portion.

6. A steering gear assembly comprising:
a housing;
a steering input shaft having an end portion thereof extending into said housing;
bearing means rotatably mounting said steering shaft end portion with respect to said housing;
a steering worm on said end portion of said steering shaft;
a steering nut mounted on said worm for axial movement thereon;
a plurality of rack teeth formed on said nut, said teeth having flanks generated along an axis extending obliquely to and substantially radially of, said worm;
a steering output shaft having an end portion thereof extending into said housing;
a sector on said end portion of said output shaft;
a plurality of teeth formed on said sector for meshing engagement with said rack teeth;
a thrust member mounted on said end portion of said output shaft, said member abutting a portion of said housing;
a generally U-shaped wedge member mounted on said output shaft between said sector and said thrust member, and movable in a radial plane of said output shaft, but fixed to said shaft for rotary movement therewith;
a biasing arrangement secured in said housing and effective in a centered position of said output shaft to engage said wedge member and thereby tend to displace said shaft longitudinally in a sense to take up play between the flanks of said rack and sector teeth.

7. A steering gear assembly comprising:
a housing;
a steering input shaft having an end portion thereof extending into said housing;
bearing means rotatably mounting said steering shaft end portion with respect to said housing;
a steering worm on said end portion of said steering shaft;
a steering nut mounted on said worm for axial movement thereon;
a plurality of rack teeth formed on said nut, said teeth having flanks generated along an axis extending obliquely to and substantially radially of, said worm,
a steering output shaft having an end portion thereof extending into said housing;
a sector on said end portion of said output shaft;
a plurality of teeth formed on said sector for meshing engagement with said rack teeth;
a thrust member mounted on said end portion of said output shaft, said member abutting a portion of said housing;
a generally U-shaped wedge member mounted on said output shaft between said sector and said thrust member, and movable in a radial plane of said output shaft, but fixed to said shaft for rotary movement therewith;
a biasing arrangement secured in said housing and effective in a centered position of said output shaft to engage said wedge member end thereby tend to displace said shaft longitudinally in a sense to take up play between the flanks of said rack and sector teeth;

and said wedge member has two pairs of opposed side faces and the one of said pairs adjacent said sector runs substantially radially of said output shaft longitudinal axis and the other of said pairs adjacent said thrust member runs obliquely to said one pair and said longitudinal axis, and said thrust member is a roller bearing assembly and has a race portion adjacent said other pair of opposed side faces, and formed with an obliquely extending surface for abutment with said other pair of side faces.

8. A steering gear assembly, as claimed in claim 1, wherein a pin member removably positioned in said housing is engageable with said wedge member and said sector to locate said wedge member and said sector in said housing, and a closure member is securable on said housing for engagement with said wedge member and said sector to thereby retain them in position and allow removal of said pin member.

* * * * *